(No Model.) 2 Sheets—Sheet 1.
W. H. MORGAN.
BRAKE FOR ELECTRIC MOTORS.
No. 532,475. Patented Jan. 15, 1895.
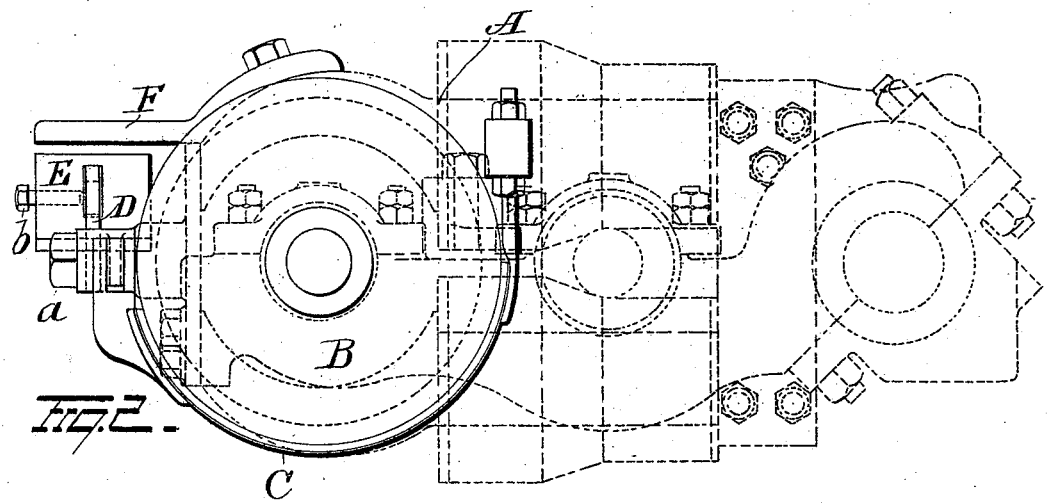
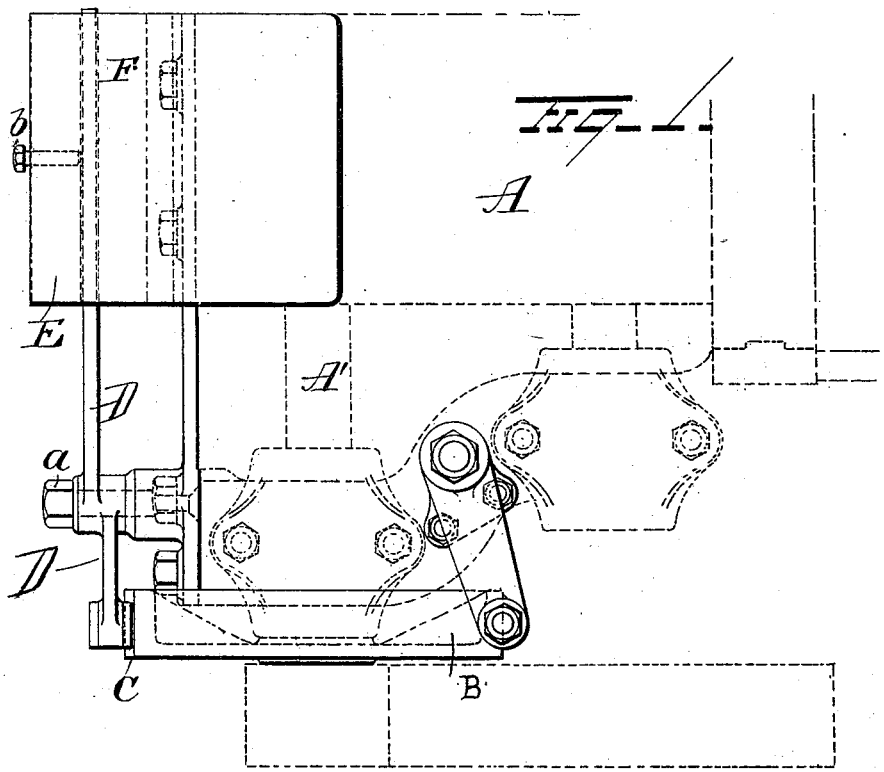
Witnesses
R. A. Nottingham
G. F. Downing
Inventor
W. H. Morgan
By H. A. Seymour
Attorney (No Model.) 2 Sheets—Sheet 2.
W. H. MORGAN.
BRAKE FOR ELECTRIC MOTORS.
No. 532,475. Patented Jan. 15, 1895.
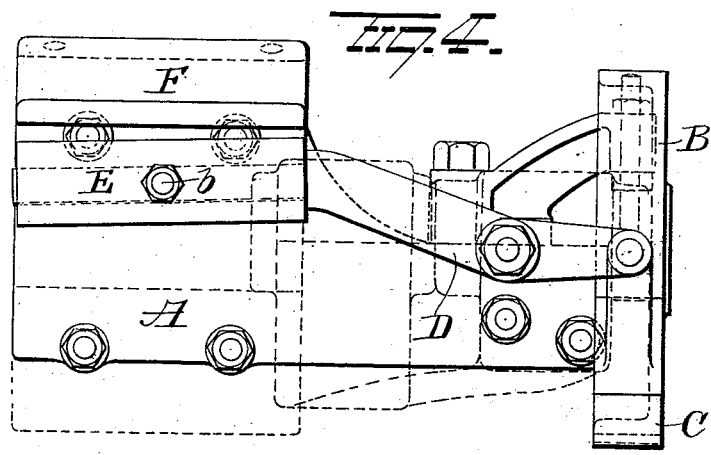
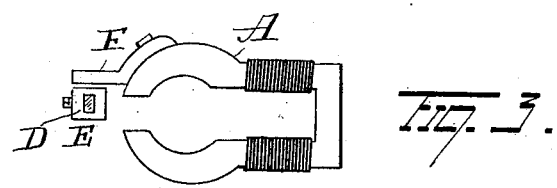
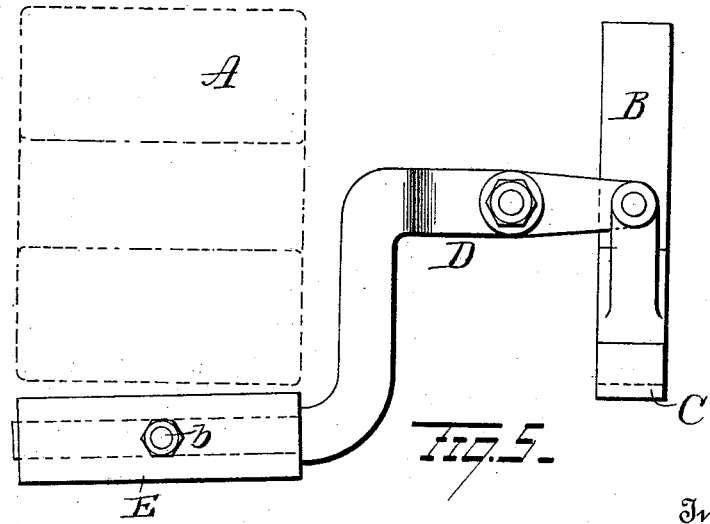
Witnesses
E. Nottingham
G. F. Downing
Inventor
W. H. Morgan
By H. A. Seymour
Attorney

UNITED STATES PATENT OFFICE.

WILLIAM H. MORGAN, OF ALLIANCE, OHIO, ASSIGNOR OF THREE-FOURTHS TO THOMAS R. MORGAN, SR., THOMAS R. MORGAN, JR., AND JOHN R. MORGAN, OF SAME PLACE.

BRAKE FOR ELECTRIC MOTORS.

SPECIFICATION forming part of Letters Patent No. 532,475, dated January 15, 1895.

Application filed March 19, 1894. Serial No. 504,287. (No model.)

*To all whom it may concern:*

Be it known that I, WILLIAM H. MORGAN, of Alliance, in the county of Stark and State of Ohio, have invented certain new and useful Improvements in Brakes; and I do hereby declare the following to be a full, clear, and exact description of the invention, such as will enable other skilled in the art to which it appertains to make and use the same.

My invention relates to an improvement in brakes for electric motors adapted more particularly for use in connection with motors employed on electrically operated cranes, elevators, &c., and it consists essentially of a brake connected to a lever and an arm carried by the lever and located adjacent to the field of the motor, and adapted to be attracted by the field when the current is passing through the motor, thereby releasing the brake, the weight of the armature applying the brake when the current is cut off.

In the accompanying drawings, Figure 1 is a plan view of a motor embodying my invention. Fig. 2 is a view in side elevation of same. Fig. 3 is a diagrammatic representation of the motor and armature. Fig. 4 is an end view showing the brake wheel, brake, lever and weight, and Fig. 5 is a modification.

This invention is designed more particulaly as an improvement on Patent No. 496,429, granted me May 2, 1893, which discloses and claims a brake lever actuated by solenoids located in the motor circuit. These solenoids besides taking up considerable space, are expensive and add materially to the cost of the crane. With this invention I dispense altogether with the solenoids and employ the field of the motor as a magnet.

A represents the motor the armature shaft A' of which is designed to be geared up to the winding drum, or driving wheels of a crane, or to any other apparatus it is designed to operate or propel and also provided with a brake wheel B. Secured to the motor frame is one end of a brake strap C, the opposite end of which is secured to the short arm of the lever D. This lever D is pivoted at $a$ to the motor frame and is provided at the end of its longer arm with the weight E which is also an armature, the said weight being sufficiently heavy to apply the brake strap, which as clearly shown in the drawings partly embraces the brake wheel B on the armature shaft A'. This weight is adjustably secured on the lever D by a set screw $b$ by means of which it can be adjusted toward or away from the pivot $a$ for the purpose of decreasing or increasing the frictional contact of the brake band on the wheel. When the current is passing through the motor the field thereof which is rigid from one pole to the other becomes saturated forming an electro magnet.

Secured to the field or integral therewith is a soft iron bracket F, the under face of which is flat and smooth. The weight E rests under this bracket and sufficiently close thereto to be attracted by same when the current is passing through the motor.

In the modification disclosed in Fig. 5 I have dispensed with the bracket F and bent the lever D so as to bring the weight E under the field of the motor.

With either construction, when the current is passing through the motor the field becomes saturated and draws up the combined weight and armature E, thereby moving the lever D on its pivot $a$ and moving the brake strap away from the brake wheel, thus leaving the brake wheel free to rotate. When the circuit through the motor is broken either accidentally or purposely, the field or bracket F secured thereto will be de-energized and allow the combined weight and armature to drop. This dropping of the weight elevates the short end of lever D and forces the brake strap into engagement with the brake wheel. The weight of the combined armature and weight and long arm of the lever is sufficient to apply the brake strap to the brake wheel with a force sufficient to hold said brake wheel against rotation and as the brake wheel is locked, it follows that the armature shaft A' to which said brake wheel is secured is also held against rotation.

While I have described a brake band, it is evident that I can employ a brake shoe in the place of same, and it is also evident that other slight changes in the construction might be resorted to without departing from the spirit of my invention. Hence I would have it understood that I do not confine myself to the exact construction herein shown and described, but, Having fully described my invention, what I claim as new, and desire to secure by Letters Patent, is—

1. The combination with an electric motor and a brake wheel, of a pivoted lever, a friction device connected to the short arm of said lever, and an armature carried by the long arm of said lever, the said armature adapted to rest in close proximity to the field of the motor and be attracted thereto when the field is energized to effect a release of the brake, substantially as and for the purpose set forth.

2. The combination with an electric motor, a brake wheel and a bracket projecting from the field of the motor, of a pivoted lever, a friction device connected to the short arm of the lever, and an armature carried by the long arm of the lever, the said armature adapted to rest under and in close proximity to the bracket or projection attached to the field of the motor and be attracted thereto when the field is energized to effect a release of the brake, substantially as and for the purpose set forth.

In testimony whereof I have signed this specification in the presence of two subscribing witnesses.

WILLIAM H. MORGAN.

Witnesses:
   H. W. HARRIS,
   T. D. RUSSELL.